(12) United States Patent
Mayhew et al.

(10) Patent No.: US 12,298,892 B2
(45) Date of Patent: *May 13, 2025

(54) VIDEO GAME TESTING AND AUTOMATION FRAMEWORK

(71) Applicant: GameDriver, Inc., Martinez, CA (US)

(72) Inventors: Phillip Todd Mayhew, Cary, NC (US); Shane Christopher Evans, Martinez, CA (US); Robert John Gutierrez, British Columbia (CA)

(73) Assignee: GameDriver, Inc., Martinez, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/186,886

(22) Filed: Mar. 20, 2023

(65) Prior Publication Data
US 2023/0236958 A1 Jul. 27, 2023

Related U.S. Application Data

(63) Continuation-in-part of application No. 17/567,721, filed on Jan. 3, 2022, now Pat. No. 11,829,286, which
(Continued)

(51) Int. Cl.
G06F 11/36 (2025.01)
A63F 13/35 (2014.01)
(Continued)

(52) U.S. Cl.
CPC .......... G06F 11/3688 (2013.01); A63F 13/35 (2014.09); A63F 13/60 (2014.09);
(Continued)

(58) Field of Classification Search
CPC ............ G06F 11/3688; G06F 11/3664; G06F 11/3684; G06F 11/3692; G06F 11/3409;
(Continued)

(56) References Cited

U.S. PATENT DOCUMENTS 8,788,243 B2 7/2014 Peterson et al.
9,104,814 B1 8/2015 Mompoint et al.
(Continued)

FOREIGN PATENT DOCUMENTS

KR 20130043311 A 4/2013
KR 101734349 B1 6/2017
(Continued)

OTHER PUBLICATIONS

Jesper Lehtinen, Automated GUI Testing of Game Development Tools, May 25, 2016, [Retrieved on Nov. 18, 2024]. Retrieved from the internet: <URL: https://www.theseus.fi/bitstream/handle/10024/112962/Lehtinen_Jesper.pdf?sequence=1> 48 pp. 1-48 (Year: 2016).*
(Continued)

Primary Examiner — Anibal Rivera
(74) Attorney, Agent, or Firm — Perkins Coie LLP

(57) ABSTRACT

An automated video game testing framework and method includes communicatively coupling an application programming interface (API) to an agent in a video game, where the video game includes a plurality of in-game objects that are native to the video game. The agent is managed as an in-game object of the video game. A test script is executed to control the agent, via the API, to induce gameplay and interrogate a behavior of a test object. The test object is identified from the plurality of in-game objects based on a query that specifies an object attribute of the test object.

20 Claims, 7 Drawing Sheets

Related U.S. Application Data is a continuation of application No. 16/845,912, filed on Apr. 10, 2020, now Pat. No. 11,216,358.

(60) Provisional application No. 62/833,325, filed on Apr. 12, 2019.

(51) Int. Cl.
| | |
|---|---|
| *A63F 13/60* | (2014.01) |
| *A63F 13/63* | (2014.01) |
| *A63F 13/67* | (2014.01) |
| *A63F 13/77* | (2014.01) |
| *G06F 9/54* | (2006.01) |
| *G06F 11/00* | (2006.01) |
| *G06F 11/3668* | (2025.01) |
| *A63F 13/52* | (2014.01) |
| *G06F 11/34* | (2006.01) |
| *G06F 11/3604* | (2025.01) |
| *G06F 11/362* | (2025.01) |

(52) U.S. Cl.
CPC .............. *A63F 13/63* (2014.09); *A63F 13/67* (2014.09); *A63F 13/77* (2014.09); *G06F 9/54* (2013.01); *G06F 9/543* (2013.01); *G06F 11/3664* (2013.01); *G06F 11/3684* (2013.01); *G06F 11/3692* (2013.01); *A63F 13/52* (2014.09); *A63F 2300/209* (2013.01); *A63F 2300/6018* (2013.01); *A63F 2300/6027* (2013.01); *G06F 11/3409* (2013.01); *G06F 11/3495* (2013.01); *G06F 11/3608* (2013.01); *G06F 11/3644* (2013.01); *G06F 11/3672* (2013.01); *G06F 11/3696* (2013.01)

(58) Field of Classification Search
CPC .............. G06F 11/3495; G06F 11/3608; G06F 11/3644; G06F 11/3672; G06F 11/3696; G06F 9/54; G06F 9/543; A63F 13/35; A63F 13/60; A63F 13/63; A63F 13/67; A63F 13/77; A63F 13/52
See application file for complete search history.

(56) References Cited

U.S. PATENT DOCUMENTS

| | | | |
|---|---|---|---|
| 10,628,294 | B2 | 4/2020 | Datta |
| 11,000,771 | B1* | 5/2021 | Boocher ................. A63F 13/35 |
| 2012/0204153 | A1 | 8/2012 | Peterson et al. |
| 2012/0209571 | A1 | 8/2012 | Peterson et al. |
| 2012/0311387 | A1 | 12/2012 | Santhosh et al. |
| 2013/0065694 | A1 | 3/2013 | Kim et al. |
| 2013/0263090 | A1* | 10/2013 | Polk ....................... A63F 13/60 |
| | | | 717/124 |
| 2015/0278076 | A1 | 10/2015 | Bs et al. |
| 2017/0340962 | A1 | 11/2017 | Jones et al. |
| 2018/0173614 | A1 | 6/2018 | Gong et al. |
| 2018/0276111 | A1 | 9/2018 | Datta |
| 2019/0034319 | A1 | 1/2019 | Boniecki |
| 2022/0370913 | A1 | 11/2022 | Kipnis et al. |

FOREIGN PATENT DOCUMENTS

| | | |
|---|---|---|
| KR | 20170099750 A | 9/2017 |
| KR | 20190019009 A | 2/2019 |

OTHER PUBLICATIONS

Iftikhar, Sidra, et al., "An Automated Model Based Testing Approach for Platform Games", ACM/IEEE 18th International Conference on Model Driven Engineering Languages and Systems (MODELS), Retrieved from the internet: <URL: https://ieeexplore.ieee.org/stamp/stamp.jsp?tp=&arnumber=733827 4> Sep. 30-Oct. 2, 2015, pp. 426-435.

Bordi, Kimmo, "Overview of Test Automation Solutions for Native Cross-Platform Mobile Applications", Retrieved from the internet on Aug. 12, 2021 from URL: https://dl.acm.org/doi/pdf/a0.1145/2700529; 2018; 85 pages.

Varvaressos, Simon, et al., "Automated Bug Finding in Video Games: A Case Study for Runtime Monitoring", Computers in Entertainment, vol. 15, No. 1, Article1; Feb. 2017, 28 pages.

International Search Report and Written Opinion received for counterpart International Application No. PCT/US2024/020627 mailed Jul. 1, 2024 (13 pages).

* cited by examiner

FIG. 3

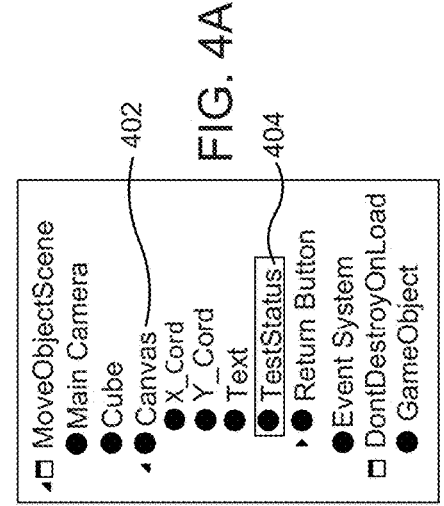
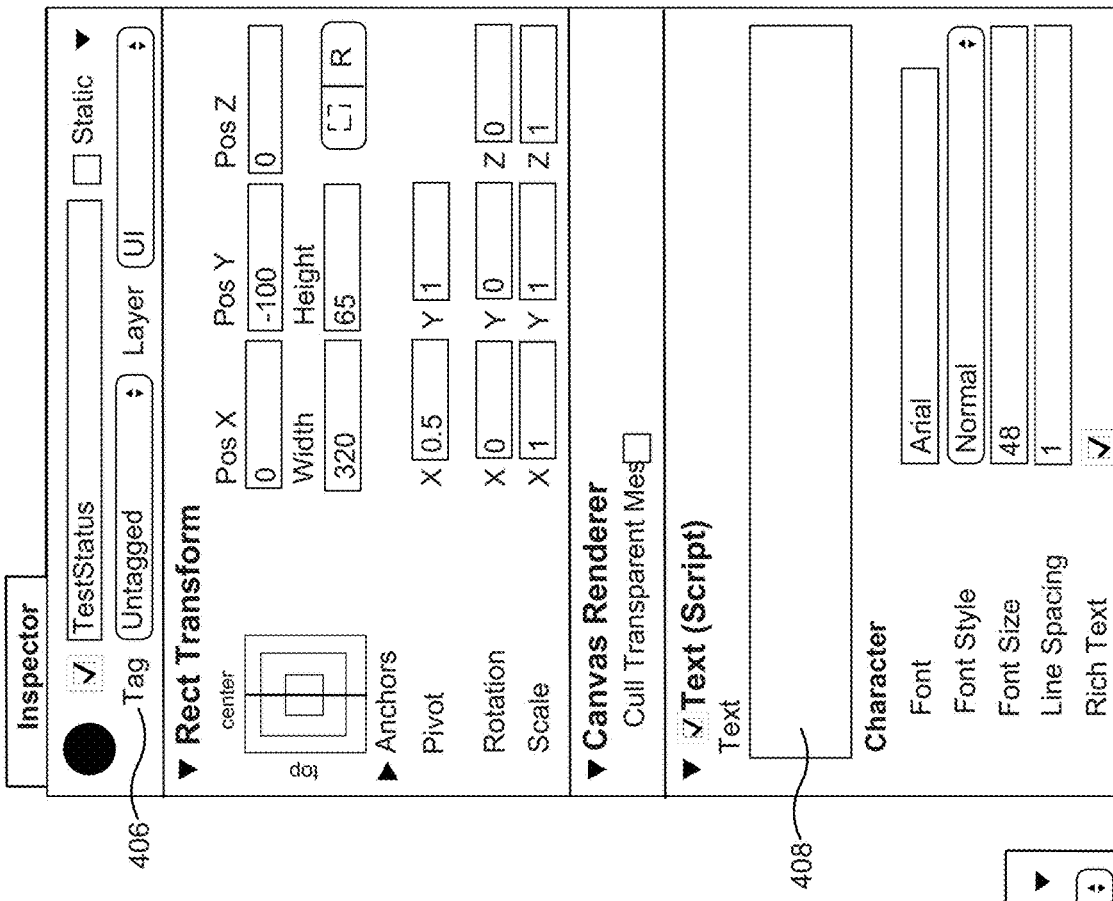
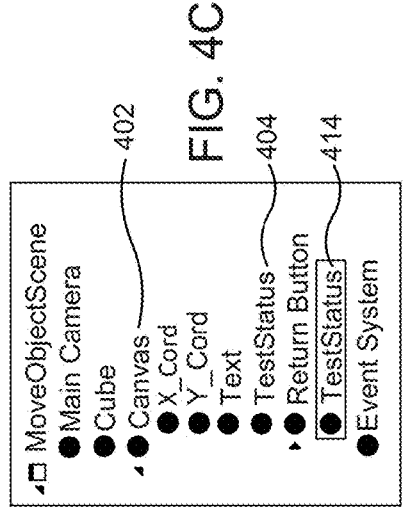
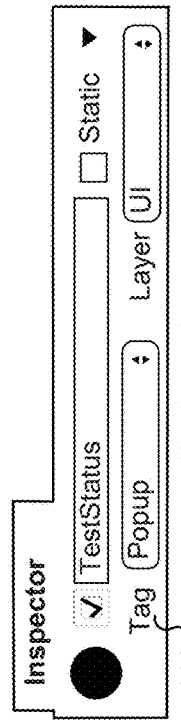

VIDEO GAME TESTING AND AUTOMATION FRAMEWORK

CROSS-REFERENCE TO RELATED APPLICATION

This application is a continuation-in-part of U.S. patent application Ser. No. 17/567,721, filed Jan. 3, 2022, now U.S. Pat. No. 11,829,286, which is a continuation of Ser. No. 16/845,912, filed Apr. 10, 2020, now U.S. Pat. No. 11,216,358, which claims the benefit of U.S. Provisional Patent Application No. 62/833,325, filed Apr. 12, 2019, all of which are incorporated herein by reference in their entireties.

TECHNICAL FIELD

This disclosure relates to systems and methods for automated video game testing.

BACKGROUND

Video games, virtual reality, and augmented reality have consistently exceeded growth estimates for over a decade and are forecast to grow to $180 billion by 2021. Currently, the largest entertainment category globally is video gaming, which is larger than film, television, or digital music. However, current game quality management is performed using obsolete practices, manual testing, and unmaintainable methods. Moreover, poor quality gaming products and leaked plot points of video games damage market sentiment, impact sales, and even damage a franchise's market viability.

Video games are tested prior to their release. Testing solutions historically used to test a game in development have been designed for specific video games that were separately developed for each engine and platform. As such, the testing tools were customized for each video game of each engine and gaming platform. The development process has recently converged across platforms and, as such, an opportunity has arisen for standardized game testing. Despite this opportunity, automated video game testing technologies remain elusive because the gaming industry has largely kept manual testing practices due to a lack of reliable alternatives.

Beta testing is another common practice used by certain game developers that cannot afford to pay for extensive human testing. However, beta testing involves more manual testing and introduces more downside risks. For example, beta testing makes the intellectual property of video games vulnerable to copying by competitors, even though beta testing is strictly meant for players to test the video games. The intellectual property may include functional techniques and story lines that can be copied or mimicked by competitors. As a result, the appeal of a widely distributed video game is diminished by other video games that offer similar features or storylines. Accordingly, game testing is cost-prohibitive for both large developers and small developers that cannot afford to forgo beta testing As such, a need exists for improved testing within the video game industry that synthesizes testing across multiple gaming platforms and improves testing speed, reliability, and reproducibility.

BRIEF DESCRIPTION OF THE DRAWINGS

Various features and characteristics of the disclosed technology will become more apparent to those skilled in the art from a study of the Detailed Description in conjunction with the drawings. Embodiments of the technology are illustrated by way of example and not limitation in the drawings, in which like references may indicate similar elements.

FIG. 3 is a screenshot of an example viewer generated by a game testing system.

FIGS. 4A-4E show user interfaces illustrating an application of the query structure.

Figure 1:
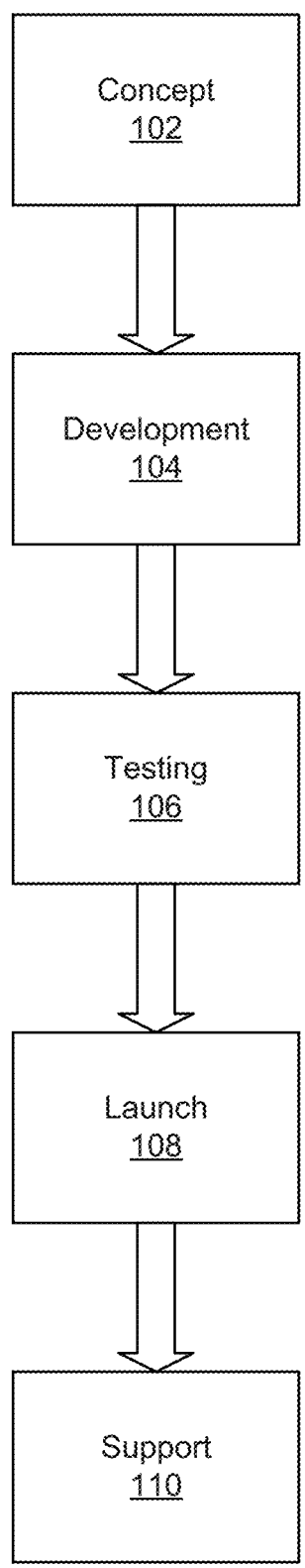
FIG. 1 illustrates a process for video game development.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. These concepts and applications fall within the scope of the disclosure and the accompanying embodiments.

The disclosed technology can be embodied using special-purpose hardware (e.g., circuitry), programmable circuitry appropriately programmed with software and/or firmware, or a combination of special-purpose hardware and programmable circuitry. Accordingly, embodiments may include a machine-readable medium having instructions that may be executed to test a video game.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like may refer to any connection or coupling, either direct or indirect, between two or more elements. The coupling or connection between the elements can be physical, logical, or a combination thereof.

Reference to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing multiple tasks.

When used in reference to a list of multiple items, the word "or" is intended to cover all of the following interpretations: any of the items in the list, all of the items in the list, and any combination of items in the list.

The sequences of steps performed in any of the processes described herein are exemplary. However, unless contrary to physical possibility, the steps may be performed in various sequences and combinations. For example, steps could be added to, or removed from, the processes described herein. Similarly, steps could be replaced or reordered. Thus, descriptions of any processes are intended to be open-ended.

Introduced herein are embodiments to improve testing of video games, 2D, 3D, virtual reality (VR), augmented reality (AR), and mixed reality (MR) technologies with a reusable test automation framework. As such, the disclosed embodiments establish modern testing techniques for developers to improve product quality, reduce costs, and achieve a market advantage by improving time to market and customer sentiment. Although the disclosure mainly describes embodiments in the context of video game testing, the disclosed testing and automation framework can be readily utilized to test any non-video game products (e.g., any 2D, 3D, VR, AR and/or MR products).

In some embodiments, an automated video game testing method includes communicatively coupling an application programming interface (API) to an agent in a video game, where the video game includes a plurality of in-game objects that are native to the video game. The agent is managed as an in-game object of the video game. A test script is executed to control the agent, via the API, to induce gameplay and interrogate one or more target objects selected from the plurality of in-game objects native to the video game. Video game data indicating a behavior of the one or more target objects during the gameplay is received. Based on the received video game data, performance of the video game is evaluated.

In some embodiments, a video game testing system that is communicatively coupled to a game engine can include a processor and a non-transitory computer readable storage medium. The storage medium stores a test script and computer program code that when executed by the processor causes the processor to execute the test script to test gameplay of a video game in the game engine. The video game includes a plurality of in-game objects that are native to the video game and an agent that is embedded in the video game as an in-game object and controllable from outside the video game to drive actions in the video game based on the execution of the test script. Via the agent, the processor receives and stores video game data indicating responses of the video game to the actions driven by the agent.

In some implementations, a non-transitory computer readable storage medium stores executable computer program instructions comprising an API. When executed, the instructions cause a processor to receive, from a video game testing system, commands to control actions of one or more target objects in a video game, the video game including a plurality of in-game objects that are native to the video game. The processor also communicatively couples to an agent component that is embedded in the video game and managed as an in-game object of the video game to cause the agent to drive the actions specified in the received commands. The processor retrieves video game data indicating responses of the video game to the actions driven by the agent, and sends the video game data to the video game testing system to evaluate performance of the video game based on the indicated responses.

Using the disclosed approach to test automation, the video game testing framework described herein is uniquely poised to capitalize on a previously unidentified greenfield software marketplace. As described in detail below, the framework includes tools and support that is needed by the gaming industry for knowledge, practice, and to nurture a global community of automation engineers, leading to improvements in game quality in the process.

FIG. 1 depicts a process for video game development. The process begins at a concept stage 102, in which a concept for the game is developed. The concept stage typically involves modeling tools, game engine integration, and animation prototyping. The next stage is development 104, which includes drafting of executable computer program code for the video game and can involve commodity tooling, rich multi-platform support, and an automated build and deployment of the game. Next, in a testing stage 106, the video game is tested to ensure that the video game performs as intended. The next stage is video game launch 108. This stage involves automated distribution of the video game across multiple platforms. The launch involves fully integrated monetization and value-added services. The final stage is support 110, which involves in-game community enablement, usage tracking, and automated user feedback. Stages 106 and 110 can be repeated one or more times as user feedback is incorporated into the game and further development and testing is performed.

Historically, the testing stage 106 has primarily been a manual process. The process usually involves unit testing with customized scripts. Developers have tools for creating the customized scripts and tools for patching the video game software later. However, in this process, a testing harness is made for a specific video game that cannot be used for any other game on any other gaming platform. As such, any testing process is video-game specific. In contrast, as detailed below, the disclosed framework acts on a game engine to execute automated test scripts against it. That is, the framework has a set of tools for automating the testing of different games on different platforms. In some embodiments, the framework can be targeted for a specific game engine that deploys a game on different gaming platforms. The tests may still be game specific, but rather than developing a test framework for that game, the framework is game agnostic.

Video Game Testing Framework

Figure 2:
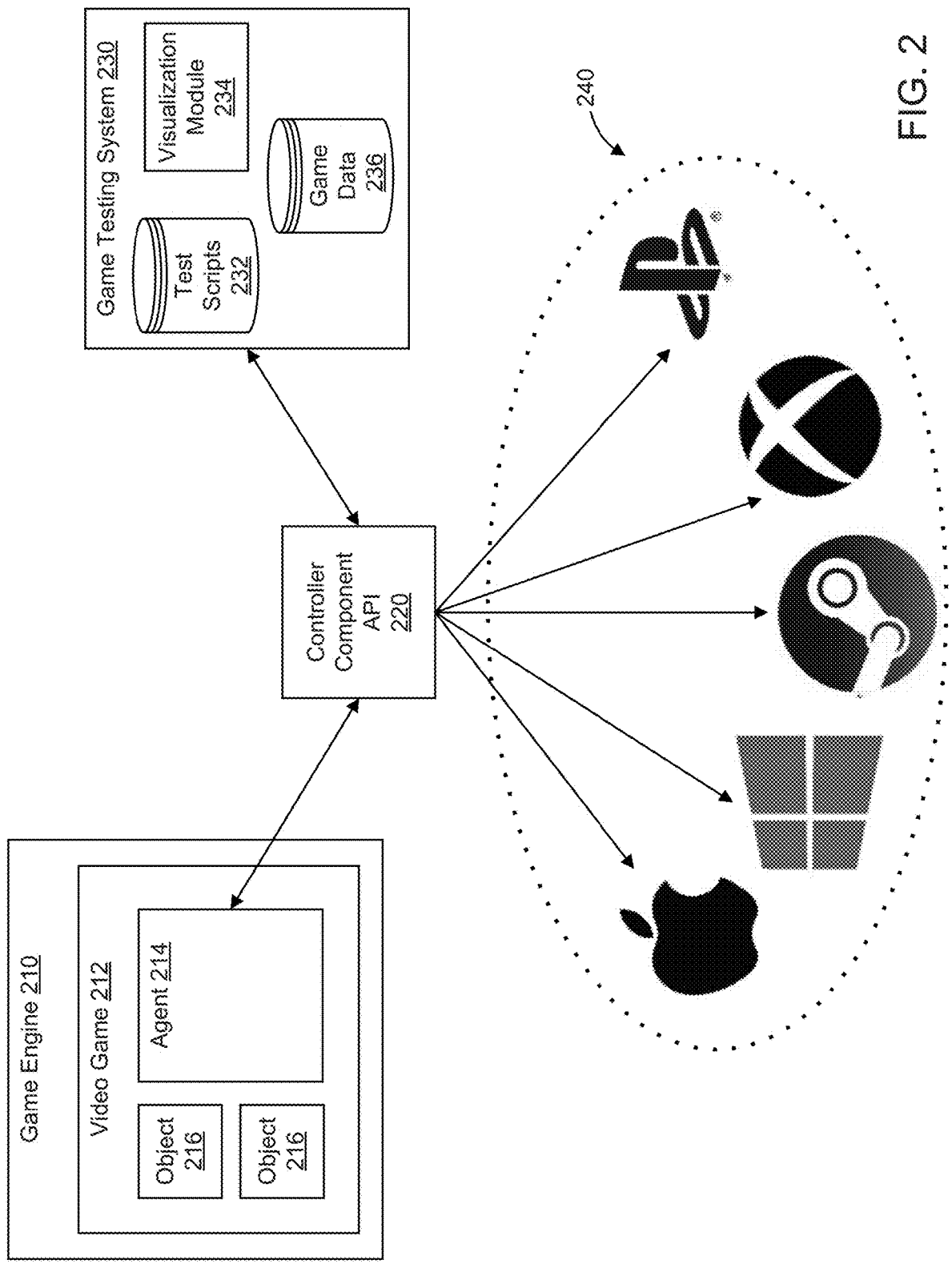
FIG. 2 is a block diagram illustrating components of a video game testing and automation framework.

FIG. 2 is a block diagram illustrating components of a video game testing and automation framework, according to some implementations. As shown in FIG. 2, the framework can include a game engine 210, a controller component application programming interface (API) 220, and a game testing system 230. Other embodiments of the framework can include additional, fewer, or different components, and functionality can be distributed differently between the components.

The game engine 210 is a software development environment for developing video games. The game engine 210 can include functionality enabling a game developer to write software for video games as well as functionality for executing portions of games, such as simulating game physics, rendering two- or three-dimensional images, or synthesizing sound. The game engine 210 can reside on any of a variety of types of computing devices, including a desktop or laptop computer, one or more servers, or a gaming console.

A video game 212 is developed using the game engine 210. The video game 212 can include graphical components renderable by the game platforms 240 as two-dimensional graphics, three-dimensional graphics, virtual reality, augmented reality, or mixed reality. Although developed in the game engine 210, the video game 212 is designed for execution by one or multiple game platforms 240 that enable gameplay by rendering graphics for display on an associated display device, output sounds through an associated audio device, and receive user inputs to control the gameplay via associated input devices. Some video games 212 may be produced for multiple gaming platforms 240, each with different capabilities or formats. Example game platforms 240 are shown in FIG. 2; the video game may be produced for any one or combination of the illustrated platforms, or may be produced for other platforms not shown in FIG. 2.

The video game 212 includes a plurality of game objects 216 that are native to the game. Depending on the type and configuration of the game 212, the game objects 216 can be any of a variety of types of two- or three-dimensional visual objects, sounds, art, or controller objects, and may or may not be directly controllable by a player of the game 212. For example, the game objects 216 can include at least one object (such as a character) that is directly controllable by the player and at least one object that is not directly controllable but that may have behaviors derived in part from the behaviors of the controlled object. Some of the game objects 216 may be an object type that corresponds to multiple instances of the object type that exist at different times or locations in the video game. For example, one game object 216 can be a car type that defines shape and behaviors for each of several cars that are rendered during gameplay, where each of the rendered cars is an instance of the car type. Each instance can have common properties defined by the corresponding object type, but may have one or more different properties. For example, a green car and a red car can both be instances of the same car type that share the same shape and implement the same physics even though they have different colors.

To test a video game 212 under development in the game engine 210, an agent 214 is embedded in the video game 212. The agent 214 comprises computer program code that is executable by the game engine 210 as a game object of the video game. Although the game engine 210 manages the agent 214 as a game object, the agent 214 is controlled external to the game via the controller component API 220. The agent 214 can accept requests via the API 220 to manage player control, object states, and events, and can capture event data of the video game 212 based on the requests. That is, the agent 214 receives messages from the API 220 and uses those messages to drive actions locally at the video game 212. For example, the agent 214 can be controlled by a test script to cause actions that simulate user gameplay and then capture data indicating responses to the gameplay by the video game. The agent 214 therefore allows for external control from within the video game by intercepting input controls via the API 220 and external review of video game characteristics and object behaviors by capturing the video game data.

As the agent 214 executes commands received via the API 220, the agent 214 can capture video game data used to evaluate performance of the game. The data captured by the agent 214 can include any information about states of game objects or events in the game as control inputs are applied to the game, including for example current locations of game objects, rates of changes to the object positions (e.g., speed or acceleration), or current sizes or colors of the game objects. The agent 214 can respond to requests to pull data from the video game on demand or can wait for certain events to occur before responding to requests.

The controller component API 220 interfaces with the agent 214 to control and interrogate aspects of the video game 212. The controller component API 220 defines a messaging protocol for controlling a video game from within the game engine 210 and for outputting game data based on the control of the game. The API 220 can reside anywhere. For example, the API 220 can include one or more software modules executed by a server that is communicatively coupled to the game engine 210 and the game testing system 230. In other examples, the API 220 can reside on a remote desktop computer communicatively coupled to a gaming console on which a video game is rendered, on the game testing system 230, or in a game engine or console. Using the defined messaging protocol, the API 220 interfaces between the agent 214 and the game testing system 230 to send testing commands to the agent to cause the agent to control inputs to or actions of objects within the video game 212. The API 220 can also receive video game data from the agent 214 that is captured during gameplay, sending the received data to the game testing system 230 to evaluate the video game's performance. The API 220 can control the agent 214 to simulate gameplay for multiple gaming platforms 240.

Implementations of the API 220 can process a simple query structure to identify objects in a game and direct commands to the identified objects, without requiring a test developer to understand object hierarchies within the game. Some commands in test scripts may refer to a particular object (e.g., by a name of the object in the video game) and interrogate the particular object either to cause the object to perform an action or to capture its behavior after an input. Other test script commands may include a simple query structure that specifies one or more properties of a target object. The API 220 parses the simple query expression to extract the specified properties and identify any objects or instances of objects in the video game that match the extracted properties. The API 220 can then direct the agent 214 to interrogate the identified objects or instances. The agent 214 can identify objects based on any object property that is specified in the video game 212, such as name, tag, color, size, or relative position in the game. Based on the simple query language provided by the API 220, the API 220 enables a video game tester to find any object or object instance in the video game to interrogate or manipulate the object, without requiring the tester to know an object's name or its location in the video game.

Objects in a game may be referenced by a hierarchical path. In an example, three objects MenuItem1, MenuItem2, and MenuItem3 appear in a video game's code in the following path:
SceneName
  Canvas
    Menu
      MenuItem1
      MenuItem2
      MenuItem3

A tester who desires to test the behavior of MenuItem3 when left clicked can write the following command:
Api.ClickObject("//MenuItem3", Api.Mouse Buttons.LEFT);

In another example, the query structure enables a tester to refer to an instance of an object with a desired <tag> property. An example command referring to an object with an "Options" tag is as follows:
Api.ClickObject("//*[../@tag='Options'"]/@name");

In both of these examples, if the position or <tag> property of the desired object MenuItem3 were to change in the video game, the API 220 can still locate the desired object using one or more known properties to identify and interact with the object.

The game testing system 230 executes test scripts that call the API 220 to control aspects of video games within the game engine 210. Based on execution of the test scripts, the API 220 returns video game data to the game testing system 230 for storage or analysis. The game testing system 230 is a computing device that includes one or more processors and a memory. As shown in FIG. 2, the game testing system 230 can maintain a test script store 232 and a game data store 236, and can execute a visualization module 234.

The test script store 232 stores one or more test scripts that can be executed by the processor of the game testing system 230 to automate video game testing. A test script that can be executed by the game testing system 230 includes a set of commands instructing the agent 214, via the API 220, to perform actions within the video game or capture video game data. For example, a test script can cause the agent 214 to run a sequence of gameplay steps that involve interactions with one or more other game objects 216 and to extract information about how the video game responds to the sequence of steps. Test scripts can be platform-agnostic while the API 220 manages testing the video game across different gaming platforms 240, such that a single test script can be used to evaluate the video game's performance on multiple gaming platforms.

To cause the agent 214 to execute a command with respect to a game object 216, a test script can include a command that refers to a specific object. For example, a script can direct a specific object to perform an action by calling the object by its name given in the video game source code. Objects can also be identified by simple queries in test scripts, rather than by direct identification. For example, a test script may refer to an object by one or more of its properties rather than by an explicit name, where the one or more properties are specified in a simple query expression. When the API 220 is called in a test script command with a simple query expression, the API 220 parses the simple query expression to extract the properties and determine game object(s) that match the specified properties. The API 220 can then pass the command to the agent 214 with an identification of the matching objects, instructing the agent 214 to carry out the command with respect to the matching objects.

Test scripts can also define parameters by which the game testing system 230 can evaluate the video game data captured by the agent 214. These parameters can include expected behaviors for objects in the game. Expected behaviors can be expressed in various implementations as expected qualitative or quantitative object responses to inputs, ranges for expected game outputs, or performance thresholds. For example, expected object behaviors can include an expected sequence of events triggered by the agent's input, an expected interaction between objects, an expected change of state of an object (e.g., changing from one color to another color), expected game physics (e.g., an expected distance traveled by an object in response to simulated application of a given force), or any other relevant event or state that may result from the test script commands.

Furthermore, test scripts can define rules for carrying out tests or evaluations. Some test scripts may include a rule that causes the game testing system 230 to store the captured video game data in the game data store 236 for later analysis, visualization, or comparison to other data captured from the same or a different video game. Some test scripts can include a rule that causes the game testing system 230 to compare the video game data against the expected behaviors and output a result of the comparison. The rule can cause the result to be output in any meaningful way specified by the test designer, such as a binary comparison (e.g., an indication of whether the game passed or failed a test or whether a parameter fell within a specified range), a graphical or visual comparison (e.g., a graph comparing expected trajectories of an object to actual measured trajectories), or numerical values indicating performance (e.g., a percentage of tests that passed or failed).

Test scripts can be written by a designer or tester of the video game 212, using either the game testing system 230 or another system communicatively coupled to the game testing system. The test scripts can be stored in a test script store 232 such that the same script can be executed any number of times to ensure reproducible results.

Some of the test scripts can be generated by the game testing system 230, rather than written by a game tester. In some implementations, the game engine 210 or the game testing system 230 include a record-and-replay mechanism to capture gameplay of a human tester that can be replayed later as an automated test case. The game testing system 230 can generate scripts that represent actions taken by the tester during the gameplay, storing them in the test scripts store 232 for later execution. The generated test scripts may also be edited by the tester to produce hybrid scripts, where a portion of the script was automatically generated by the game engine 210 or game testing system 230 based on recorded gameplay and another portion of the script was written by a test developer.

The game data store 236 maintains video game data collected by the agent 214 in response to execution of test scripts. Depending on rules specified in the test scripts, the video game data stored in the game data store 236 can include raw data extracted from the video game. For example, if a test script is designed to test the velocity and trajectory of a ball that is kicked in a video game, the raw data can include positions and states of the ball that were collected at periodic time stamps during test execution. The stored video game data can also include processed data that is generated by the game testing system 230 or agent 214 based on the raw data. For example, the processed data can include a calculation of the ball's velocity and a maximum height and distance of the ball's trajectory. Additionally or alternatively, the stored data can include a result of a performance evaluation. For example, if the ball was expected to reach a maximum simulated velocity of 20 m/s when kicked but only reached 10 m/s during a test, the game processing system 230 may store an indication that the test failed in the game data store 236.

Figure 3:
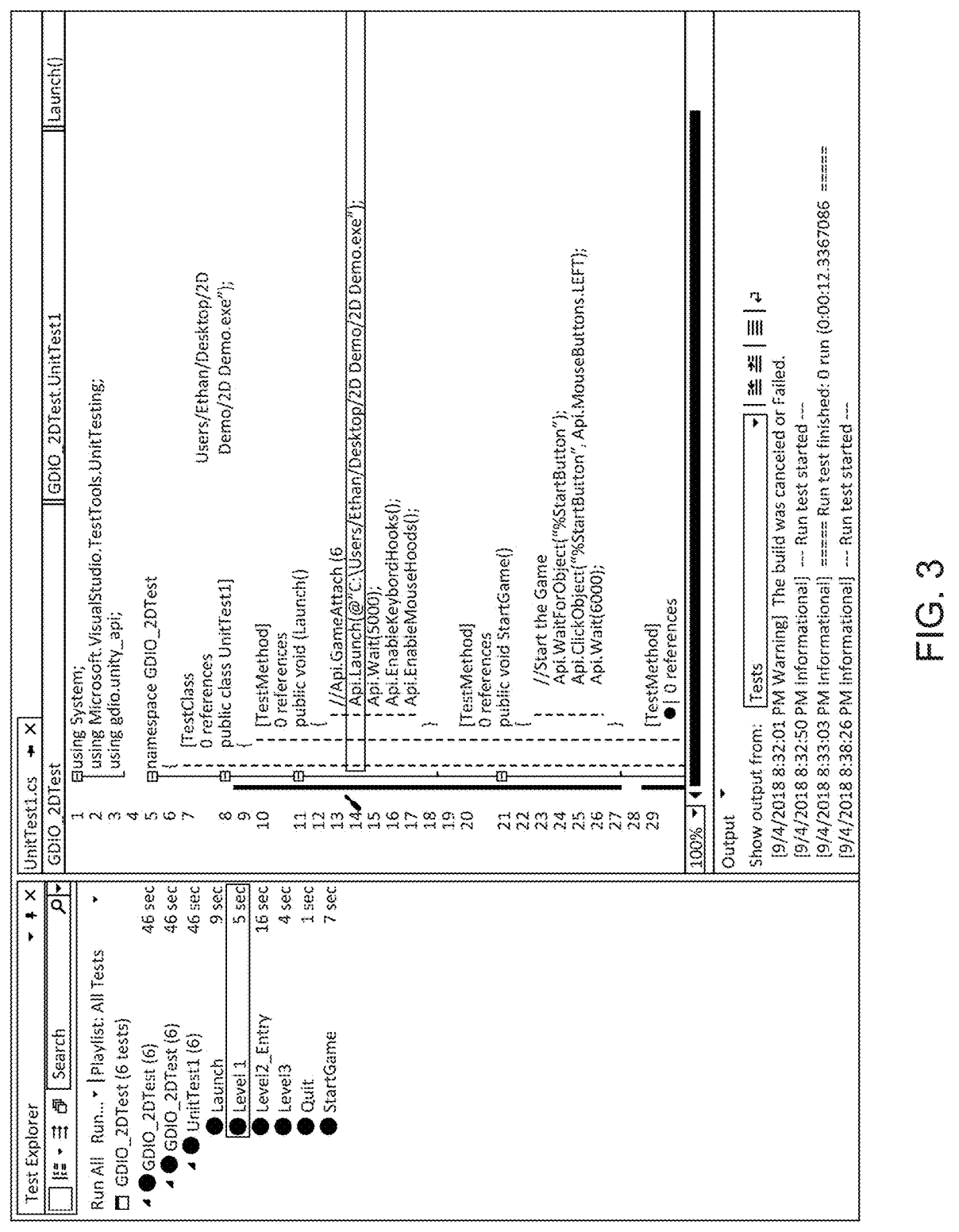

The visualization module 234 generates a viewer for displaying information to a user of the game testing system 230. A screenshot of an example viewer generated by the visualization module 234 is shown in FIG. 3. Designed for cross-platform execution, the viewer can be part of a single solution for two-dimensional, three-dimensional, virtual reality, augmented reality, and mixed reality products and can interface with a variety of game engines 210 via the API 220. The viewer can enable developers and testers to write test scripts or capture gameplay for record-and-replay tests. FIG. 3 illustrates an example state of the viewer when displaying a test script and enabling a developer to edit the test script. The viewer can also allow for a tester to view outputs of a variety of test cases of video games on different platforms. To generate the test case outputs, the visualization module 234 can retrieve game data from the game data store 236 and display the data in a format specified in a corresponding test script. For example, a test script that analyzes physics of a ball kicked by a video game character may cause the visualization module 234 to generate a plot showing a position of the ball over a period of time following the kick action.

Object Queries in a Video Game Testing Platform

When testing a video game, developers or testers often need to find objects within the game in order to test their behaviors. A query structure supported by at least some embodiments of the API 220 and/or game testing system 230 defines a syntax enabling the identification of game objects based on one or more specified attributes. The query structure takes object attributes as arguments and causes a system executing the query to iterate through the objects in a video game to identify one or more objects that satisfy the object attributes. Queries can be used anywhere within the video game testing framework. For example, queries can be embedded within test script commands such that the API 220 parses the query and performs an object search during execution of the test script. Other queries can be directed to the video game testing system 230, for example through a user interface, where the system 230 parses the query and outputs an identification of an object matching the attributes specified in the query.

Figure 4E:
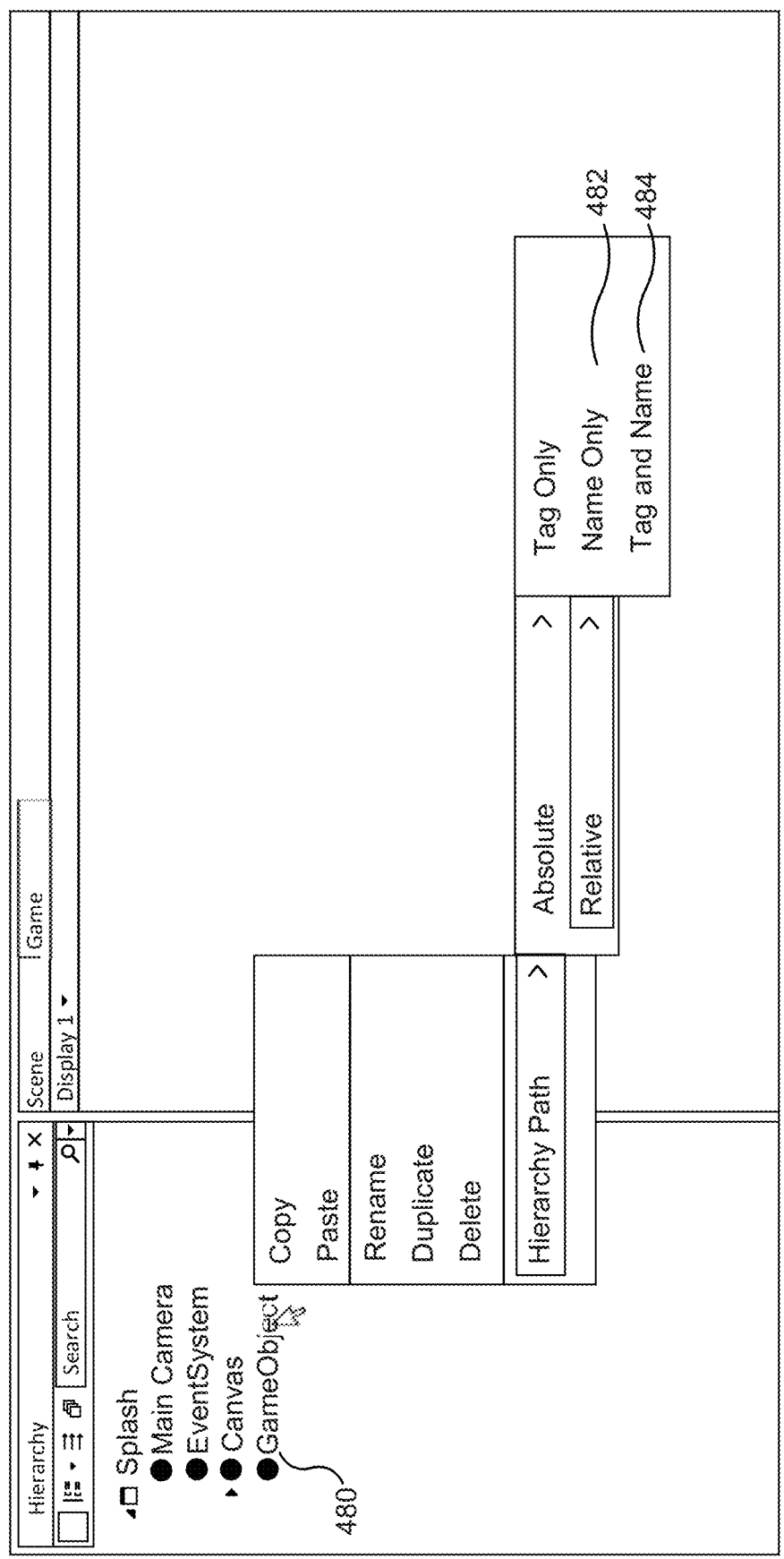

FIGS. 4A-4E show user interfaces illustrating an application of the query structure. In FIG. 4A, a menu (displayed, for example, within a viewer generated by the game testing system 230) shows a hierarchy of objects in a video game. An object 402 named "Canvas" has a sub-object 404 named "TestStatus." A user can inspect properties of the "TestStatus" object by opening an inspector as shown for example in FIG. 4B. The inspector shows attributes of the object, such as an object tag 406 and text 408 associated with the object. The "TestStatus" object shown in FIG. 4B has the tag "Untagged" and no associated text.

An identification of the "TestStatus" object can be output by the video game testing system 230 in response to a query for an object that has a name attribute matching the string "TestStatus". An example of such a query is:
Api.GetObjectFieldValue("//*[@name='TestStatus']/fn:component('UnityEngine.UI.Text')/@text");
where:
"Api.GetObjectFieldValue( ) is a function that is called within a test script.

"//*[@name='TestStatus'] is a a relative path to the desired object, where the asterisk "*" notation refers to a wildcard match for a property of the object. Here, the query will return the first object with the @name field containing the string "TestStatus".

"fn:component is an internal function call for returning a child object of the returned "TestStatus" object. The fn:component function in the example above contains the argument type ('UnityEngine.UI.Text') and the property of the desired component, which is the @text property.

Another example query, as follows, specifies an absolute path to the desired object:
Api.GetObjectFieldValue("/*[@name='Canvas']/*[@name='TestStatus']/fn:component('UnityEngine.UI.Text')/@text");
where the "/*[@name='Canvas']" portion of the query specifies the object 402 that is the parent object to the "TestStatus" object 404 (as shown in FIG. 4A). The absolute path to the desired object can be specified rather than a relative path, for example, when there are multiple objects with the same "TestStatus" name.

An alternative query structure returns a particular one of multiple instances of an object using an instance number. For example, FIG. 4C illustrates two instances of an object named "TestStatus", objects 404 and 414, with the same parent object 402 "Canvas." The two instances are ordered within an object hierarchy, with the first object 404 being earlier in the hierarchy than the second object 414 (as indicated, for example, by its higher position in the object hierarchy displayed in FIG. 4C). An example query to retrieve the second instance 414 is as follows:
Api.GetObjectFieldValue("/*[@name='Canvas']/*[@name='TestStatus'][1]/fn:component('UnityEngine.UI.Text')/@text");
where the instance number [1] results in the second instance of the object being returned rather than the first.

Additional functions can be specified in a query to return the first or last instance of an object. For example, the following query:
Api.GetObjectFieldValue("/*[@name='Canvas']/*[@name='TestStatus'][first( )]/fn:compone nt('UnityEngine.UI.Text')/@text");
returns the first instance of the object named "TestStatus" within the absolute path indicated by the query.

Other queries in the video game testing system use object tags to identify objects, rather than name as described in the examples above. Object tag queries can have similar structures to the object name queries shown above, but can be useful when there are groups of objects with the same name but different tags, or groups of objects with different names and the same tag. For example, referring to the hierarchy shown in FIG. 4A and the object attributes shown in FIG. 4B, the following query refers to the "TestStatus" object via an absolute path:
Api.GetObjectFieldValue("/Untagged/Untagged[3]"); This query specifies the fourth untagged object that is the child of a single object with no duplicates, which in FIG. 4A is the "TestStatus" object 404. A similar query adds object names to the path for clarity and specificity:
Api.GetObjectFieldValue("/Untagged[@name='Canvas']/Untagged[@name='TestStatus']");

FIG. 4D illustrates an example where the second "TestStatus" object shown in the hierarchy of FIG. 4C has the tag 416 of "Popup." This object can be identified by the following query, which specifies the object's absolute path:

Api.GetObjectFieldValue("/Untagged[@name='Canvas']/Popup[@name='TestStatus']");
In this query, the "/Popup" tag enables the system to locate the desired object even if another object named "TestStatus" exists in the hierarchy below the "Canvas" object and before the desired object, as long as the other "TestStatus" object does not also use the "Popup" tag.

A similar query refers to the object by a relative path, for example in case the relative position of the desired object changes due to ongoing game development:
Api.GetObjectFieldValue("//Popup[@name='TestStatus']");
This query will return the first instance of an object with the name of "TestStatus" and the tag of "Popup", regardless of where the object exists in the object hierarchy.

Still other queries in the video game testing system use other fields or properties of an object to identify objects. By way of example, the text property 408 of the TestStatus object shown in FIG. 4B is filled with the string "Test Complete" if a test of the object is successfully executed. To identify whether the text field has the "Test Complete" string after execution of a test, the following query can be used:
Api.GetObjectPosition("//*[@name='TestStatus']/fn:component('UnityEngine.UI.Text')/@te xt='Test Complete'");
In this example, the function GetObjectPosition is used because a specific field value is desired. If instead a test is designed to wait until a field value is a certain length, for example, a WaitForObjectValue function can be used:
Api.WaitForObjectValue("//*[@name='TestStatus']/fn:component('UnityEngine.UI.Text')/@t ext","Length","int: 13");

In a final example, the query structure used in the video game testing system can support any combination of object names, tags, or other attributes using boolean operators contained within a predicate clause. The following example query uses the boolean operator "and":
Api.GetObjectPosition("//*[@name='Button' and fn:component('UnityEngine.UI.Text')/@text='Default String Value")"; 
Parent or grandparent object properties can be support as well, such as in the following query:
Api.GetObjectPosition("//TagButton[../@name='Canvas']");
which identifies an object in a video game that contains the tag "TagButton" and has a parent object named "Canvas".

Other object attributes can be used in queries instead or in addition to names, tags, or instance numbers associated with objects. For example, queries can specify any combination of name, tag, instance number, color, length, text, or material associated with a desired object. The query structures used to search for these other attributes can be similar to the example queries described above.

In some embodiments, a developer can use the viewer of the video game testing system to retrieve object attributes in order to build queries. FIG. 4E illustrates an example user interface (which, for example, is part of a viewer generated by the visualization module 234) to output an attribute for use as a query argument. In the example user interface, the user has right-clicked on an object 480 named "GameObject" that is identified within the viewer. If the user selects, for example, the menu option "Name Only" 482 under the relative path option, the system outputs the relative path
//*[@name='GameObject']. This value can be pasted into a test query, for example Api.GetObjectPosition("//*[@name='GameObject']");. If instead the user selects the menu option "Tag and Name" 484, the system outputs the relative path value
/Untagged[@name='GameObject'].

Automated Video Game Testing

Figure 5:
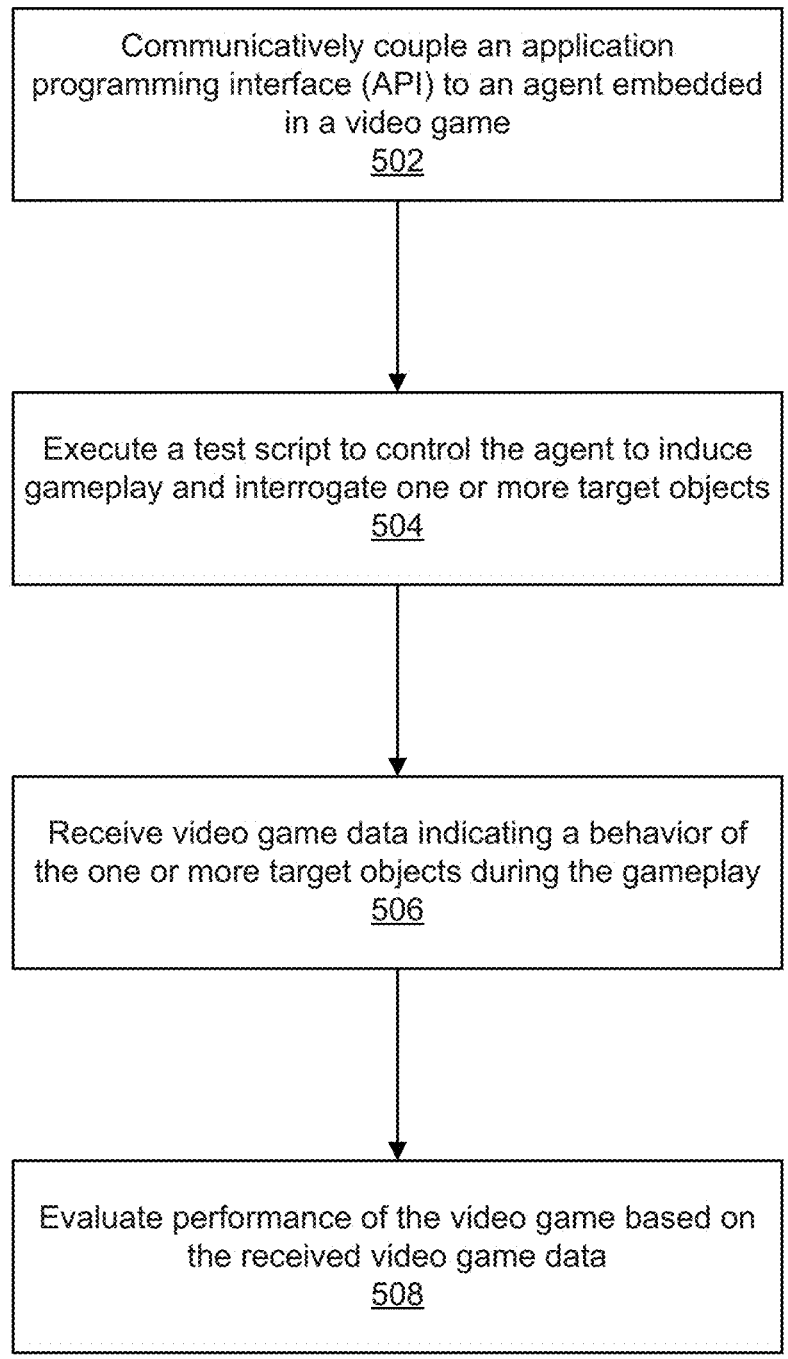
FIG. 5 is a flowchart illustrating a process for automated testing of video games.

FIG. 5 is a flowchart illustrating a process for automated testing of video games, according to some embodiments. The process shown in FIG. 5 can be performed by a processor executing computer program code. For example, the process can be executed at least in part by a processor in the game testing system 230. The process shown in FIG. 5 can be executed to test video game performance across multiple gaming platforms 240, using a single test script to ensure that the video game will function as expected on each gaming platform. Furthermore, the automated testing process can be repeated any number of times using the same test script to ensure reliable and uniform video game tests.

At block 502 shown in FIG. 5, the processor communicatively couples an application programming interface (API) 220 to an agent 214 embedded in a video game 212. The video game, which can be a partial or complete game under development in a game engine, includes a plurality of in-game objects that are native to the video game. The agent 214 is managed by the game engine as an in-game object of the video game.

At block 504, the processor executes a test script that causes the processor to control the agent 214 through calls to the API 220 to induce gameplay and interrogate one or more target objects of the video game. The processor can retrieve the test script from a test script store 232 when a video game test is initiated, such as in response to a command from a tester using the game testing system 230. When interrogating the objects under the control of the test script, the agent 214 may drive an action by a target object in the video game or receive states or behaviors of the target objects in response to game inputs. Some test scripts may explicitly identify the target object to be interrogated by the agent, and the API 220 passes the identification of the target object to the agent 214 during testing. Other test scripts may include a simple query expression specifying at least one property of the object the test developer would like to target, and the API 220 interprets the simple query expression to determine the target object that matches the specified property.

At block 506, the processor receives video game data indicating a behavior of the one or more target objects during the gameplay. The agent 214 triggers actions in the video game 212 based on commands in the test script and collects types of video game data specified by the test script. As the agent 214 collects the video game data, the agent 214 returns the data to the game testing system via the API 220.

Based on the received video game data, the processor at block 508 evaluates performance of the video game. To evaluate the game's performance, the processor can compare object behaviors collected by the agent 214 against expected behaviors. The processor can additionally or alternatively store the video game data or evaluation metrics, enabling the video game data to be displayed to the user of the game testing system 230 or compared against data collected from tests of the same or different video games.

Embodiments of the agent 214 and video game testing framework described herein can mimic an end user's gameplay to compare the output of the test case to expected outputs, which can be used to validate the functionality or performance of the video game. An advantage of simulating end user gameplay includes speed, accuracy, reproducibility, and more comprehensive testing compared to using actual human testers. This provides reliable replication of test cases without any deviation from the original test case. This functionality enables a series of user tests for video games on various platforms, as opposed to the customized unit tests of conventional testing.

In some embodiments, the framework could be used to automate basic test cases that are otherwise performed by human testers, and more advanced test cases remain a manual process thereby reducing the amount of manual testing compared to conventional procedures. A test case that is developed for one game could be utilized for other games, the same game in other platforms, or for later releases of the same game. In any of these scenarios, the amount of test cases that must be manually performed is reduced.

The framework is usable for other games on the same platform. For example, existing testing procedures would require giving a human user a set of scenarios, which are then implemented by the human user to determine whether the video game passed those tests. In contrast, the disclosed framework can automate the implementation of test scenarios such that at least some manual testing is unnecessary.

Embodiments of the disclosed framework offer numerous benefits. Examples include reduced costs from less manual testing, lower defect rates (e.g., higher potential revenue), and improved time to market. In contrast, with existing testing procedures, costs of subsequent game releases increase because more manual testing is required for the later releases. Therefore, the framework reduces costs associated with testing subsequent releases of a video game due to the automation that resulted from testing earlier releases.

Accordingly, the disclosed embodiments offer modern and effective game testing with accelerated and efficient test cycles. This is particularly important given the increased compute power and graphical capabilities required for modern video games. Moreover, the demographic shift in gamers to people with greater incomes combined with access to "always-connected" mobile devices has made gameplay a popular activity. In fact, numerous video games are released each year with development cost estimates between $5 to $20 million. The largest and most complex categories of video games often exceed $100 million and have surpassed $250 million. In the broader software industry, quality costs are set at between 18 to 22% of a project's budget. Combined, these factors create a service addressable market (SAM) for game testing greater than $1 billion annually, which can be improved with the disclosed framework.

To improve adoption by the gaming industry, the disclosed embodiments can utilize a subscription model to allow penetration in the market to grow quickly. For example, a review of the global market shows that only a handful of gaming products and game engines dominate the market. A combination of market growth and homogenization of game engines has allowed for opportunities that make the disclosed framework possible. The framework improves testing across all the game engines so that development teams can focus on creating worlds, stories, and ever more immersive experiences. As a result, complicated structures such as light sources, physics engines, and movement models can be reused, not re-created from scratch by each studio.

Example Processing System

Figure 6:
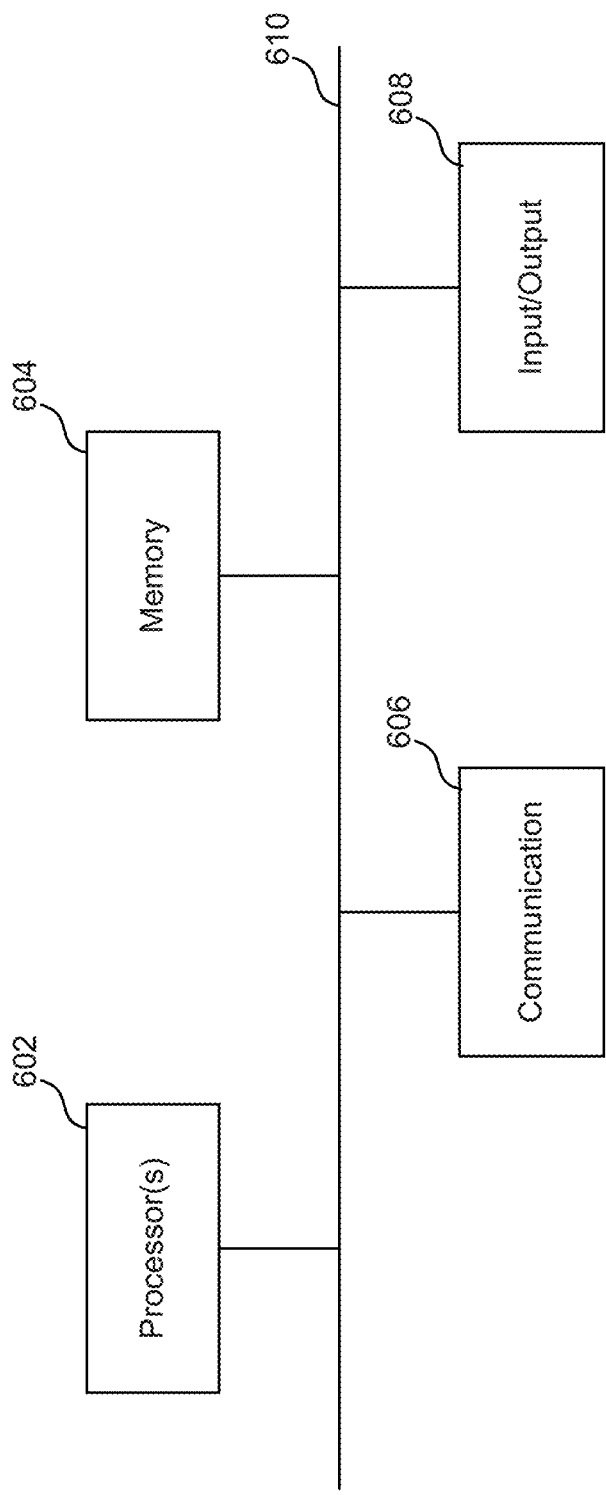
FIG. 6 is a block diagram illustrating an example processing system.

FIG. 6 is a block diagram illustrating an example of a processing system in which at least some operations described herein can be implemented. The processing system can be processing device 600, which represents a system that can run any of the methods/algorithms described above.

For example, the game testing system 230 can be implemented as the process system 600, and the game engine 210 and controller component API 220 can reside on devices implemented as or similar to the processing system 600. A system may include two or more processing devices such as represented in FIG. 6, which may be coupled to each other via a network or multiple networks. A network can be referred to as a communication network.

In the illustrated embodiment, the processing device 600 includes one or more processors 602, memory 604, a communication device 606, and one or more input/output (I/O) devices 608, all coupled to each other through an interconnect 610. The interconnect 610 may be or include one or more conductive traces, buses, point-to-point connections, controllers, adapters and/or other conventional connection devices. Each of the processors 602 may be or include, for example, one or more general-purpose programmable microprocessors or microprocessor cores, microcontrollers, application specific integrated circuits (ASICs), programmable gate arrays, or the like, or a combination of such devices.

The processor(s) 602 control the overall operation of the processing device 600. Memory 604 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 604 may store data and instructions that configure the processor(s) 602 to execute operations in accordance with the techniques described above. The communication device 606 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 608 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of a fully functioning computers, those skilled in the art will appreciate that the various embodiments are capable of being distributed as a program product in a variety of forms and that the disclosure applies equally, regardless of the particular type of machine or computer-readable media used to actually effect the embodiments.

From the foregoing, it will be appreciated that specific embodiments have been described herein for purposes of illustration, but that various modifications may be made without deviating from the scope of the invention. Accordingly, the invention is not limited except as by the appended claims.

We claim:

1. A computer-implemented method comprising:
communicatively coupling an application programming interface (API) to an agent embedded in a video game, the video game including a plurality of in-game objects that are native to the video game and that each have a corresponding set of attributes;
executing, by a processor, a test script that when executed causes the processor to control the agent via the API to induce gameplay, the test script including a query specifying an object attribute of a test object and an action to perform to interrogate a behavior of the test object;
identifying, by the processor, the test object from the plurality of in-game objects based on the object attribute specified in the query; and
controlling the agent via the API to perform the action to interrogate the behavior of the test object.

2. The method of claim 1, wherein the object attribute specified in the query includes at least one of an object name, an object tag, an object color, an object length, an object material, or object text.

3. The method of claim 2, wherein the query further includes an instance number of the test object.

4. The method of claim 3, wherein the plurality of in-game objects are ordered within a hierarchy, and wherein identifying the test object based on the instance number comprises:
identifying a set of in-game objects that match the object attribute specified in the query; and
select from the identified set, an in-game object having a position within the ordered hierarchy of the set that matches the instance number as the test object.

5. The method of claim 1, wherein the test object is part of a hierarchy of objects in the video game, and wherein the query specifies a relative path to the test object in the hierarchy.

6. The method of claim 1, wherein the test object is part of a hierarchy of objects in the video game, and wherein the query specifies an absolute path to the test object in the hierarchy.

7. The method of claim 1, further comprising:
generating, by the processor, a viewer that displays identifiers of at least a subset of the in-game objects including the test object; and in response to a user input at the viewer in association with the identifier of the test object, outputting the object attribute of the test object.

8. The method of claim 1, wherein the query is included within an API function call that causes the API to perform the action.

9. The method of claim 1, wherein the test script when executed causes the agent to generate an input directed to the test object and capture data indicating a response of the test object to the input.

10. The method of claim 1, wherein the test script when executed causes the agent to generate an input directed to the test object and capture data indicating a behavior of one or more other in-game objects after the input.

11. The method of claim 1, wherein the API controls the agent to simulate gameplay on a plurality of gaming platforms.

12. A non-transitory computer readable storage medium storing executable computer program instructions, the computer program instructions when executed by a processor causing the processor to:
   receive a query specifying multiple object attributes of a test object in a video game, the test object being one of a plurality of in-game objects that are native to the video game;
   traverse the plurality of in-game objects to identify the test object based on a match between attributes of the test object and the multiple object attributes specified in the query; and
   output an identifier of the test object in response to the identification.

13. The non-transitory computer readable storage medium of claim 12, wherein the object attributes specified in the query include at least one of an object name, an object tag, an object color, an object length, an object material, or object text.

14. The non-transitory computer readable storage medium of claim 13, wherein the query further includes an instance number of the test object.

15. The non-transitory computer readable storage medium of claim 14, wherein the plurality of in-game objects are ordered within a hierarchy, and wherein identifying the test object based on the instance number comprises:
   identifying a set of in-game objects that match the object attribute specified in the query; and
   select from the identified set, an in-game object having a position within the ordered hierarchy of the set that matches the instance number as the test object.

16. The non-transitory computer readable storage medium of claim 12, wherein the test object is part of a hierarchy of objects in the video game, and wherein the query specifies a relative path to the test object in the hierarchy.

17. The non-transitory computer readable storage medium of claim 12, wherein the test object is part of a hierarchy of objects in the video game, and wherein the query specifies an absolute path to the test object in the hierarchy.

18. A video game testing system, comprising:
   a processor; and
   a non-transitory computer readable storage medium storing executable computer program instructions, the computer program instructions when executed by the processor causing the processor to:
      communicatively couple an application programming interface (API) to an agent embedded in a video game, the video game including a plurality of in-game objects that are native to the video game and that each have a corresponding set of attributes;
      receive a query specifying multiple object attributes;
      identify an object of the plurality of in-game objects that matches the object attributes specified in the query; and
      control the agent via the API to interrogate behaviors of the identified object.

19. The video game testing system of claim 18, wherein the query is included within an API function call that causes the API to identify the identified object and perform an action to interrogate the behaviors of the identified object.

20. The video game testing system of claim 18, wherein the object attributes specified in the query include at least one of an object name, an object tag, an object color, an object length, an object material, or object text.

* * * * *